United States Patent
Kim et al.

(10) Patent No.: US 9,209,986 B2
(45) Date of Patent: *Dec. 8, 2015

(54) METHOD AND APPARATUS FOR TRANSMITTING MULTIMEDIA BROADCAST DATA IN WIRELESS COMMUNICATION SYSTEM

(71) Applicant: Samsung Electronics Co., Ltd., Gyeonggi-do (KR)

(72) Inventors: Seong Hun Kim, Gyeonggi-do (KR); Himke Van Der Velde, Middlesex (GB)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,035

(22) Filed: Jan. 26, 2015

(65) Prior Publication Data

US 2015/0139065 A1    May 21, 2015

Related U.S. Application Data

(63) Continuation of application No. 14/579,026, filed on Dec. 22, 2014, which is a continuation of application No. 13/379,252, filed as application No. PCT/KR2010/003907 on Jun. 17, 2010, now Pat. No. 8,923,345.

(30) Foreign Application Priority Data

Jun. 17, 2009   (KR) .................. 10-2009-0053850

(51) Int. Cl.
*H04L 12/18*   (2006.01)
*H04L 1/00*    (2006.01)
*H04N 21/4363* (2011.01)
*H04W 4/06*    (2009.01)

(Continued)

(52) U.S. Cl.
CPC ............ *H04L 12/189* (2013.01); *H04L 1/0006* (2013.01); *H04L 1/0029* (2013.01);
(Continued)

(58) Field of Classification Search
None
See application file for complete search history.

(56) References Cited

U.S. PATENT DOCUMENTS 8,923,345 B2 * 12/2014 Kim et al. ............. 370/509
2006/0088058 A1 *  4/2006 Eckert et al. ........... 370/469

(Continued)

FOREIGN PATENT DOCUMENTS

KR   1020020014940   2/2002
KR   1020040026153   3/2004

(Continued)

OTHER PUBLICATIONS

PCT/ISA/237 Written Opinion issued on PCT/KR2010/003907 (pp. 4).

(Continued)

*Primary Examiner* — Andrew Chriss
*Assistant Examiner* — Joshua A Kading
(74) *Attorney, Agent, or Firm* — The Farrell Law Firm, P.C.

(57) ABSTRACT

A base station and method for use in a wireless system are provided. The method includes receiving, by a base station, one or more service data units (SDUs) from a core network node; receiving, by the base station, a control message including respective length information of the one or more SDUs from the core network node; identifying, by the base station, consecutive SDUs are not received; and muting, by the base station, one or more subframes impacted by a loss of the consecutive SDUs based on the length information included in the control message. The control message is transmitted after the one or more SDUs are transmitted from the core network node.

6 Claims, 16 Drawing Sheets

(51) Int. Cl.
  *H04W 56/00* (2009.01)
  *H04L 12/26* (2006.01)
  *H04L 29/06* (2006.01)

(52) U.S. Cl.
  CPC ........ *H04L12/1863* (2013.01); *H04L 12/1881* (2013.01); *H04N 21/43637* (2013.01); *H04W 4/06* (2013.01); *H04W 56/00* (2013.01); *H04W 56/001* (2013.01); *H04L 43/0829* (2013.01); *H04L 65/1066* (2013.01)

(56) References Cited

U.S. PATENT DOCUMENTS

| | | |
|---|---|---|
| 2008/0070611 A1 | 3/2008 | Yi et al. |
| 2008/0076359 A1 | 3/2008 | Charpentier et al. |
| 2008/0225891 A1 | 9/2008 | Cave et al. |
| 2009/0185477 A1 | 7/2009 | Lee et al. |
| 2010/0110958 A1 | 5/2010 | Racz et al. |
| 2010/0135212 A1 | 6/2010 | Ho et al. |
| 2010/0322246 A1 | 12/2010 | Rinne et al. |
| 2011/0044225 A1 | 2/2011 | Rinne et al. |
| 2015/0103728 A1* | 4/2015 | KIM et al. .................... 370/312 |

FOREIGN PATENT DOCUMENTS

| | | |
|---|---|---|
| KR | 1020050095419 | 9/2005 |
| KR | 1020060090138 | 8/2006 |

OTHER PUBLICATIONS

PCT/ISA/210 Search Report issued on PCT/KR2010/003907 (pp. 3).

* cited by examiner

METHOD AND APPARATUS FOR TRANSMITTING MULTIMEDIA BROADCAST DATA IN WIRELESS COMMUNICATION SYSTEM

PRIORITY

This application is a Continuation Application of U.S. application Ser. No. 14/579,026, which was filed in the U.S. Patent and Trademark Office on Dec. 22, 2014, which is a Continuation Application of U.S. application Ser. No. 13/379,252, issued as U.S. Pat. No. 8,923,345, which was filed in the U.S. Patent and Trademark Office on Dec. 19, 2011, as a National Stage Entry of PCT/KR2010/003907, which was filed on Jun. 17, 2010, and claims priority to Korean Patent Application No. 10-2009-0053850, which was filed in the Korean Intellectual Property Office on Jun. 17, 2009, the content of each of which is incorporated herein by reference.

BACKGROUND OF THE INVENTION

1. Field of the Invention

The present invention relates to a wireless communication system and, in particular, to a method and apparatus for generating and transmitting multimedia broadcast data in a wireless communication system.

2. Description of the Related Art

Mobile communication systems have been developed to provide the subscribers with voice communication services on the move. With the rapid advance of technologies, the mobile communication systems have evolved to support high speed data communication services as well as the standard voice communication services.

Recently, as the next generation mobile communication system of the 3$^{rd}$ Generation Partnership Project (3GPP), Long Term Evolution (LTE) is under development. The LTE system is a technology for realizing high-speed packet-based communication at about 100 Mbps, aiming at commercialization in around 2010. Regarding the commercialization of the LTE system, a discussion is being held on several schemes: one scheme for reducing the number of nodes located in a communication path by simplifying a configuration of the network, and another scheme for maximally approximating wireless protocols to wireless channels.

Unlike voice service, data service is characterized in that the resource is allocated according to the data amount to be transmitted and channel condition. Accordingly, in the wireless communication system such as cellular communication system, a scheduler manages resource allocation in consideration of the resource amount, channel condition, and data amount. This is also the case in the LTE system as one of the next generation mobile communication systems such that the scheduler located in the base station manages and allocates the radio resource. Also, the second layer protocols such as MAC and RLC are supported in the base station.

The wireless communication system such as LTE system supporting high speed high quality service meets the requirements for providing multimedia broadcast service, and thus there are many researches being conducted to provide the multimedia broadcast service in the wireless communication system. The multimedia broadcast service supported in LTE is called Multimedia Broadcast Multicast Service (MBMS) which is provided in such a manner that a plurality of base stations transmit the same broadcast data generated by an MBMS server. In case that multiple base stations transmit the same data, the transmission efficiency on the radio channel increases significantly. As aforementioned, however, since the second layer protocols such as the Media Access Control (MAC) and Radio Link Control (RLC) are placed at the base station, the data generated by the MBMS server are likely to lose data integrity through the second layer process at different base stations.

SUMMARY

Accordingly, the present invention is designed to address at least the problems and/or disadvantages described above and to provide at least the advantages described below.

It is an aspect of the prevent invention to provide a method and apparatus for transmitting multimedia broadcast data over radio channel while maintaining data integrity.

In accordance with an aspect of the present invention, a method is [provided for use in a wireless communication system. The method includes receiving, by a base station, one or more service data units (SDUs) from a core network node; receiving, by the base station, a control message including respective length information of the one or more SDUs from the core network node; identifying, by the base station, consecutive SDUs are not received; and muting, by the base station, one or more subframes impacted by a loss of the consecutive SDUs based on the length information included in the control message. The control message is transmitted after the one or more SDUs are transmitted from the core network node.

In accordance with another aspect of the present invention, a base station is provided for use in a wireless communication system. The base station includes a transceiver configured to transmit and receive a signal; and a controller configured to control to receive one or more service data units (SDUs) from a core network node, to receive a control message including respective length information of the one or more SDUs from the core network node, to identify consecutive SDUs are not received, and to mute one or more subframes impacted by a loss of the consecutive SDUs based on the length information included in the control message. The control message is transmitted after the one or more SDUs are transmitted from the core network node.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

The terms and words used in this description and the appended claims are not to be interpreted in common or lexical meaning but, based on the principle that an inventor can adequately define the meanings of terms to best describe the invention, to be interpreted in the meaning and concept conforming to the technical concept of the present invention.

Figure 1:
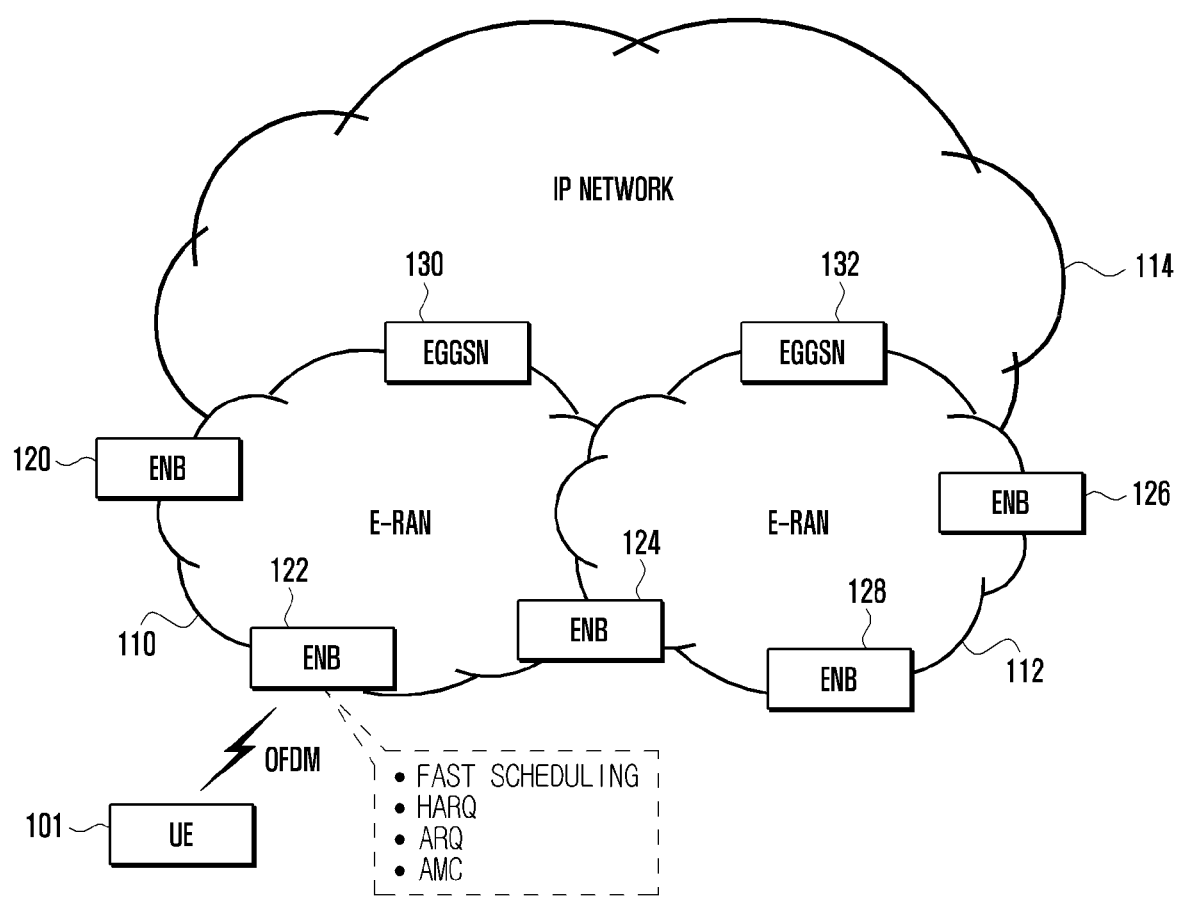
FIG. 1 is a diagram illustrating a configuration of an LTE mobile communication system.
Figure 2:
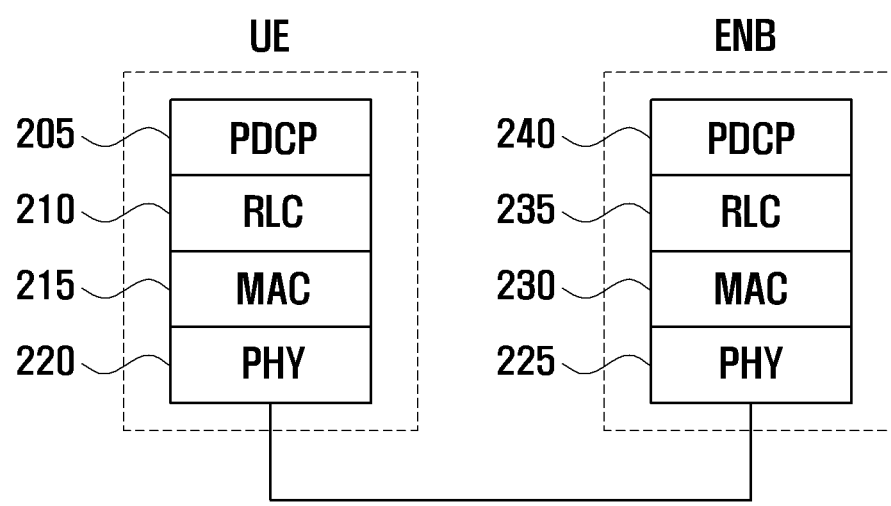
FIG. 2 is a diagram illustrating a protocol stack of an LTE mobile communication system.

Prior to the start of explanation on the present invention, a description is made of an LTE mobile communication system with reference to FIGS. 1 and 2.

FIG. 1 is a diagram illustrating a configuration of an LTE mobile communication system.

Referring to FIG. 1, the LTE mobile communication system includes Evolved Radio Access Network (hereinafter, referred to as E-RAN) 110 and 112) is simplified in two-node structure of evolved Node B (hereinafter, referred to as eNB or Node B) 120, 122, 124, 126, and 128 and higher node (Access Gateway or enhance Gateway GPRS Support Node, hereinafter referred to as EGGSN) 130 and 132. The User Equipment (hereinafter, referred to as UE) 101 accesses Internet Protocol (IP) network 114 via E-RANs 110 and 112.

The eNBs 120 to 128 corresponds to legacy node B of UMTS system. The eNBs 120 to 128 are connected with the UE 101 via radio channel and responsible for more complex functions as compared to the legacy node B. Since all the user traffics including real time services such as Voice over IP (VoIP) are transmitted through shared channel, there is a need of a device for scheduling the based on the state information of the UEs 101, and the eNB is responsible for this function in LTE. Each of the eNBs 120 to 128 manages a plurality cells.

In order to meet the requirements of maximum data rate of 100 Mbps, LTE adopts Orthogonal Frequency Division Multiplexing (OFDM) as radio access technology in maximum 20 MHz bandwidth. LTE also adopts Adaptive Modulation & Coding (AMC) for determining modulation scheme and channel coding rate depending on the channel condition of the UE 101.

Although not depicted in FIG. 1, the LTE system includes an MBMS server which generates MBMS (Multimedia Broadcast Multicast Server) data to the eNBs 120 to 128. The MBMS server and eNBs 120 to 128 are connected to each other through an IP network.

FIG. 2 is a diagram illustrating a protocol stack of an LTE mobile communication system.

Referring to FIG. 2, the protocol stack of the LTE system includes Packet Data Convergence Protocol (PDCP) 205 and 240, Radio Link Control (RLC) 210 and 235, and Medium Access Control (MAC) 215 and 230.

The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. An RLC header is added at the RLC layer 210 and 235 for the ARQ operation.

The MAC 215 and 230 is responsible for establishing connection to a plurality of RLC entities so as to multiplex the RLC PDUs into MAC PDUs and demultiplex the MAC PDUs into RLC PDUs. A MAC header is added at the MAC layer 215 and 230 for multiplexing and demultiplexing operations.

The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. In view of transmission, the data input to a protocol entity is referred to as Service Data unit (SDU), and the data output from the protocol entity is referred to as Protocol Data Unit (PDU).

A description is made of the MBMS (Multimedia Broadcast Multicast Service) hereinafter.

Figure 3:
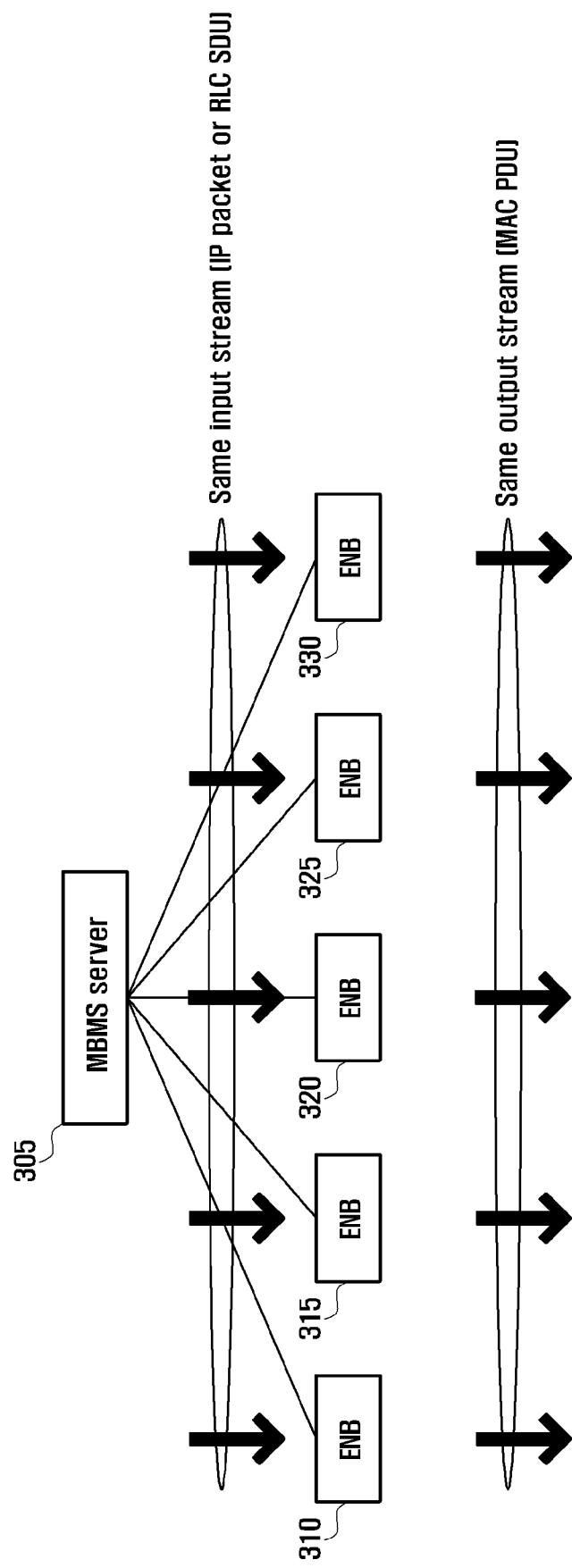
FIG. 3 is a diagram illustrating a method for providing a normal MBMS service.

FIG. 3 is a diagram illustrating a method for providing a normal MBMS service.

Referring to FIG. 3, the MBMS server 305 generates MBMS service data to the eNBs 310, 315, 320, 325, and 330 participated in the MBMS transmission. The eNBs 310, 315, 320, 325, and 330 store the data received from MBMS server 305 and transmit the stored data at a predetermined timing simultaneously.

Since the data are transmitted at the same time, the signal is amplified in strength and thus the UEs located in the coverage of the eNBs 310, 315, 32, 325, and 330 receive the signal from the multiple eNBs 310, 315, 320, 325, and 330 so as to experience high reception quality as compared to the case when receiving the signal from only one eNB. In order for the multiple eNBs 310, 315, 320, 325, and 330 to transmit the same signal, it is required to fulfill the following conditions.

Firstly, the eNBs 310, 315, 320, 325, and 330 must receive the same data; secondly, the eNBs 310, 315, 320, 325, and 330 must process the received data into the same data; and finally, the eNBs 310, 315, 320, 325, and 330 must transmit the same data simultaneously.

Figure 4:
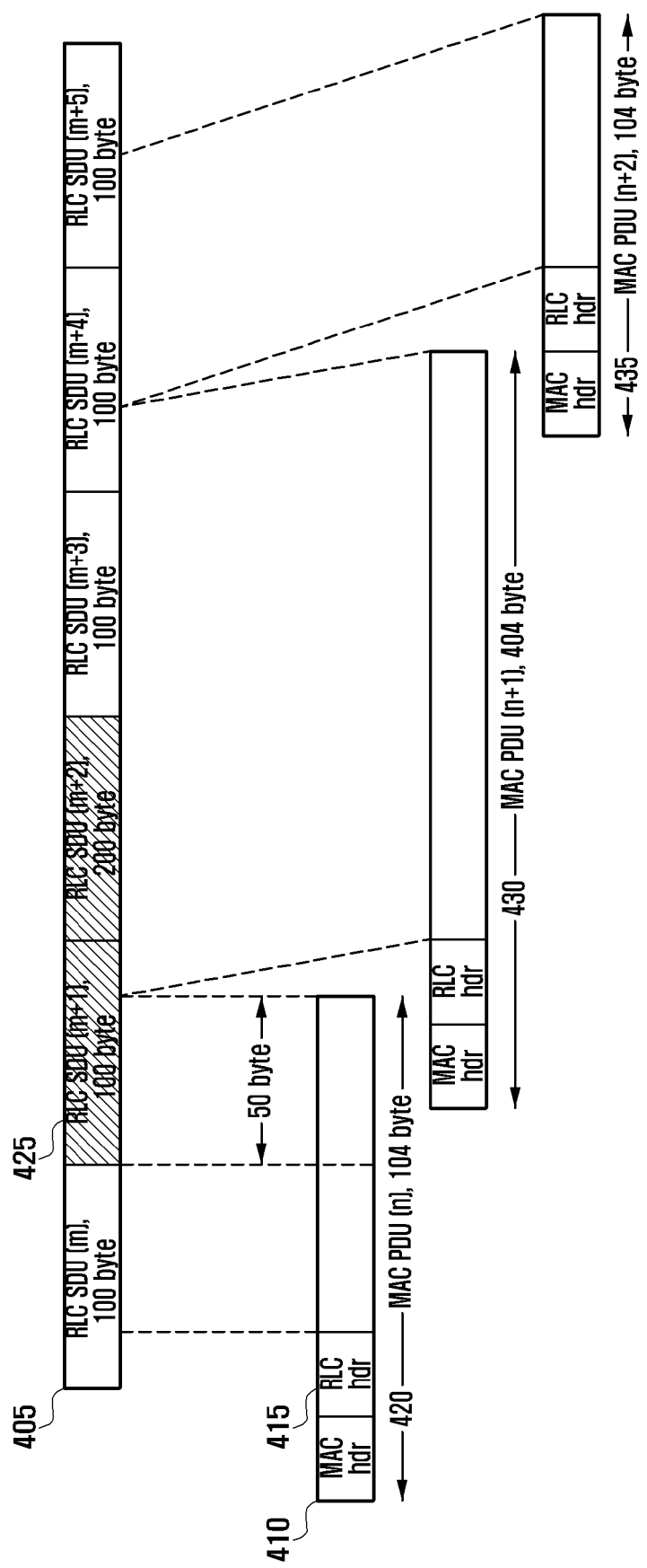
FIG. 4 is a diagram illustrating an operation of a legacy eNB in reception of a part of MBMS data.

FIG. 4 is a diagram illustrating an operation of a legacy eNB in reception of a part of MBMS data.

Referring to FIG. 4, the MBMS server transmits RLC SDU generated through a PDCP process on IP packet to eNBs, in general. Since header compression and decompression which is usual in normal data is not applied to MBMS data, RLC SDU is maintained in the form of the IP packet. Although the description is directed to the case whether the eNB receives RLC SDU, this is identical to the case that the eNB receives the IP packet.

The eNB segments or concatenates the RLC SDUs received from the MBMS server into RLC PDUs of appropriated size with the addition of RLC header and then multiplexes the RLC PDUs and adds MAC head to generate MAC PDUs. The MAC PDUs are transmitted on the radio channel. in more detail, since only one RLC PDU is encapsulated in a MAC PDU, the MAC PDU is generated by segmenting an RLC SDU or combining multiple RLC SDUs and then adding RLC header 415 and MAC header 410 to each RLC SDU.

Since all of the eNBs have the RLC and MAC protocols, if the RLC SDUs are received by the eNBs without loss, the MAC PDUs which the respective eNBs have generated with the RLC SDUs are identical among each other. However, there is any RLC SDU missed by an eNB, the eNB fails to generate the MAC PDU due to the missed RLC SDU.

The best approach to solve this problem is to transmit the next MAC PDU following the MAC PDU including the missed RLC SDU. For example, if an eNB has received the RLC SDUs with the exception of RLC SDU [m+1] 425, the eNB suspends the MAC PDUs including the RLC SDU [m+1] a bit, i.e. MAC PDU [n] 420 and MAC PDU [n+1] 425, and transmits the MAC PDU [n+2] 430.

Meanwhile, in order for the eNB to transmit MAC PDU [n+2] first, the eNB has to check which RLC SDUs start at which bytes. Here, if it is possible to predict the overheads of MAC and RLC headers added to each RLC SDU, the eNB can calculate the bytes occupied by the missed RLC SDUs in MAC PDUs from a number of missed RLC SDUs and sum of the sizes of missed RLC SDUs. Using this information, the eNB also can determine the RLC SDUs included in the suspended MAC PDUs and the bytes occupied by the RLC SDUs in the MAC PDU to be transmitted.

If it is possible to predict the RLC overhead and MAC overhead amount caused by one RLC SDU, the information necessary for the eNB to perform the aforementioned operation is the sum of the sizes of missed RLC SDUs and the number of missed RLC SDUs. Accordingly, the MBMS server transmits the RLC SDUs in SYNC frame to notify the eNB of the sum of the sizes of missed RLC SDUs and the number of missed RLC SDUs.

Figure 5:
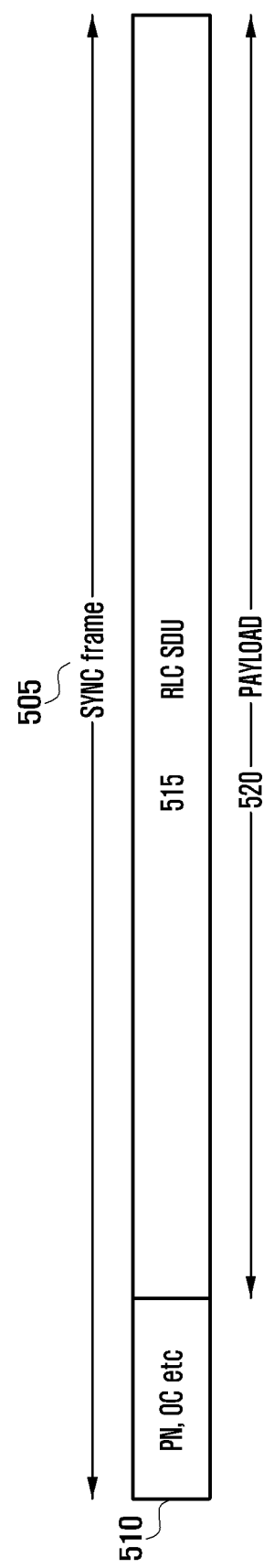
FIG. 5 is a diagram illustrating a configuration of a normal SYNC frame.

FIG. 5 is a diagram illustrating a configuration of a normal SYNC frame.

Referring to FIG. 5, the SYNC frame 505 includes a header 510 and a payload 520, and the payload 520 includes one RLC SDU. In order to simplify the explanation, the term RLC SDU is used interchangeably with the data included in the payload 520 of the SYNC frame 505.

The header 510 includes packet number, octet counter, and SYNC period-related information. The Packet Number (PN) in the information indicating the index of the SYNC frame, the Octet Counter (OC) is the information indicating the total amount of the payload of the SYNC frames transmitted before the corresponding SYNC frame. The SYNC period-related information in the information indicating the period for which the RLC SDU is transmitted in the SYNC frame. Here, the SYNC period is the period defined on a radio channel.

One or more subframes are designated as MBMS subframes for one SYNC period, and each MBMS subframe carries the MAC PDUs containing only MBMS data. The MBMS data amount to be transmitted curing the corresponding SYNC period is determined depending on the number of MBMS subframes allocated for the SYNC period. Also, the network determines the number of MBMS subframes for the SYNC period in consideration of the data rate of the MBMS service.

Meanwhile, in order to maintain PN and OC to appropriate levels, the MBMS server manages PN and OC by referencing the SYNC period. For example, the MBMS server transmits the SYNC frames carrying the data amount corresponding to the SYNC period and then initializes the PN and OC of the SYNC protocol to 0. The MBMS server repeats increment of the PN and OC for the transmission of SYNC frames as much as the data amount corresponding to the next SYNC period and initialization of the PN and OC to 0 during the next SYNC period.

Figure 6:
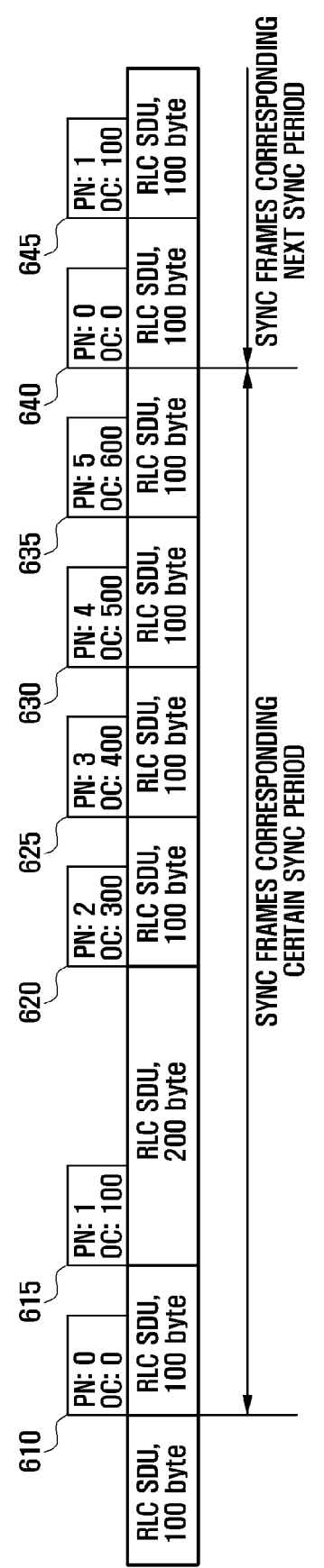
FIG. 6 is a diagram illustrating a normal principle of configuring PN and OC in the SYNC frame.

FIG. 6 is a diagram illustrating a normal principle of configuring PN and OC in the SYNC frame.

Referring to FIG. 6, if the data amount to be transmitted for SYNC period is 700 bytes, the MBMS server transmits 7 SYNC frames from the SYNC frame 610 to the SYNC frame 635 containing 700 bytes for a certain SYNC period. Both the PN and OC of the first SYNC frame 610 are set to 0, and the PN and OC of the fifth SYNC frame 630 are set to 4 and 500 respectively. Since the next SYNC frame 640 is transmitted in a new SYNC period, the PN and OC are initialized to 0. For reference, the data amount transmitted for one SYNC period is constant in general. For simplicity purpose, the RLC and MAC headers are not taken into account.

The eNB can calculate the number of missed SYNC frames and the sum of the sizes of the RLC SDUs constituting the SYNC frames based on PN and OC.

Figure 7:
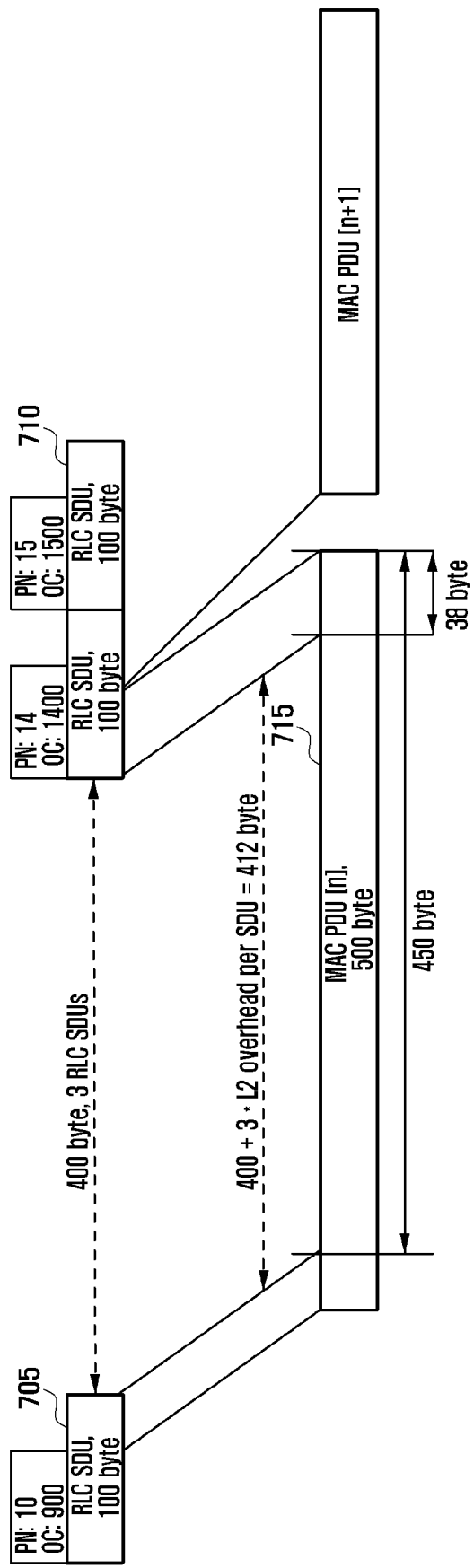
FIG. 7 is a diagram illustrating a normal principle of determining the data amount and number of missed data based on PN and OC.

FIG. 7 is a diagram illustrating a normal principle of determining the data amount and number of missed data based on PN and OC.

Referring to FIG. 7, if the SYNC frames 705 and 710 are not received, the eNB determines the three missed SYNC frames and the total 400 bytes of missed data using PN and OC of the SYNC frames 705 and 710.

Assuming that the RLC/MAC overhead per RLC SDU is 4 bytes, the eNB can check that the total 412 bytes corresponding to the missed RLC SDUs should be contained in the MAC PDU. For example, if 50 bytes of MAC PDU [n] are occupied by the RLC SDU 705 already and if the 412 bytes inserted in the rest 450 bytes, 38 bytes are remained empty. In this case, the first 38 bytes of the RLC SDU 710 occupy the remained space such that the MAC PDU [n+1] is filled with from the 39$^{th}$ byte of the RLC SDU 710. Accordingly, the eNB suspends the MAC PDU [n] carrying the missed RLC SDU and transmits the MAC PDU [n+1] which is configured normally.

As aforementioned, in order to determine the MAC PDU to be transmitted and the RLC SDU and its start byte to be filled in the MAC PDU, it must be possible to estimate the sizes of the RLC and MAC overheads per RLC SDU. In the current RLC and MAC protocols, however, the RLC/MAC overhead can vary in size according to how the RLC SDU are encapsulated in RLC PDU and whether the RLC PDU is greater than a predetermined value. For example, in case that the last byte of the RLC SDU to be encapsulated in an RLC PDU matches with the last byte of the RLC PDU, an RLC field, so called LI (Length Indicator), is omitted.

Also, the overhead caused by LI also can vary according to the number of LIs included in the RLC PDU. The overhead caused by one LI is 2 bytes, but the overhead increases to 3 bytes for two LIs. In order to make the size of the RLC/MAC overhead per RLC SDU predictable, it is necessary to modify the RLC and MAC standards. However, if it is taken into consideration that the RLC and MAC protocols should work with the UEs not supporting MBMS, protocol modification is not preferred.

In order to solve this problem, the present invention proposes a method and apparatus for the eNBs to configure and transmit MAC PDUs for MBMS without modification of the RLC and MAC protocols.

First Embodiment

In the first embodiment of the present invention, if a series of SYNC frames are not received, the eNB calculates the size of RLC SDU filled in the SYNC frame using the PN and OC values of the SYNC frame and determines the MAC PDUs to be transmitted or not and the start byte of the RLC SDU that is to be carried in the MAC PDU If it is detected that a series of SYNC frames are not received in a certain SYNC period, the eNB stops building MAC PDU from the SYNC frames including and following the missed SYNC frames. That is, the MBMS transmission is suspended for the duration reserved for the MAC PDUs that are not built.

In case that the size of the missed RLC SDU is recognized, the eNB can determine the RLC PDU carrying the corresponding RLC SDU and the number of bytes of the overhead of the RLC PDU. In the current SYNC protocol, however, it is impossible to calculate the size of the RLC SDU when a series of missed SYNC frames and the number of bytes of the overhead of the RLC SDUs although it possible when only one SYNC frame is missed. Accordingly, when a series of SYNC frames are missed, the eNB stops transmitting MAC PDU, initializing PN and OC to 0, and restarts transmitting MAC PDU from the start time point of the next SYNC period for which the MAC PDU is built with from the first RLC SDU.

Figure 8:
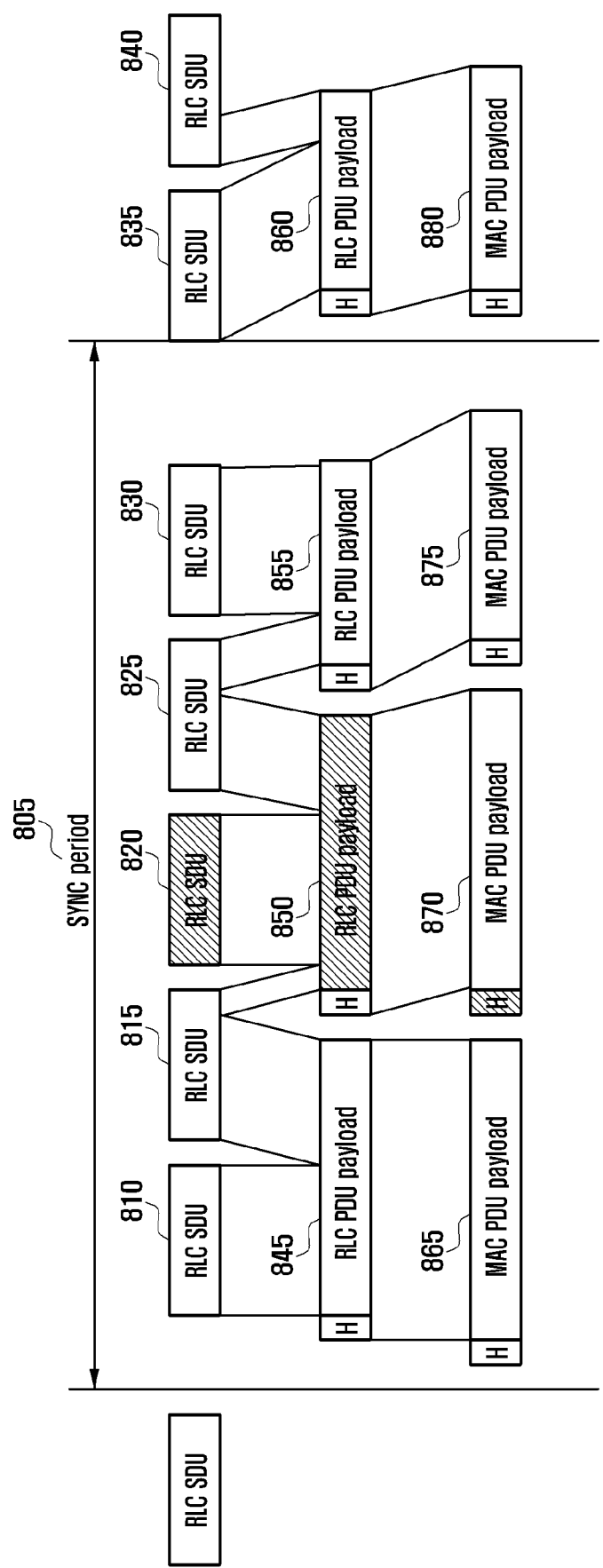
FIG. 8 is a diagram illustrating the first embodiment of the present invention.

FIG. 8 is a diagram illustrating the first embodiment of the present invention. Particularly, FIG. 1 shows the eNB operation in case where a series of SYNC frames are not received.

Referring to FIG. 8, the RLC SDUs are received successfully with the exception of the RLC PDU 820 in a certain SYNC period among 5 RLC SDUs 810 to 850. The eNBs processes the successfully received RLC SDUs according to the conventional RLC and MAC protocols to build RLC PDU and MAC PDU and transmits the MAC PDU 865 in an MBMS subframe.

The size of the missed RLC SDU 820 is calculated using PN and OC of the synch frame, and it continues to build RLC PDU and MAC PDU as if the corresponding size of RLC SDU is received. This can be implemented in various manner, e.g. by generating a virtual RLC SDU equal to the missed RLC SDU in size and building RLC PDU and MAC PDU continuously with the generated RLC SDU. In spite of the missed RLC SDU, the MAC PDU 870 including the virtually generated RLC SDU is discarded rather than transmitted in the corresponding MBMS subframe.

This means that the MAC PDU is not transmitted in the MBMS subframe. The eNB restarts transmission from the MAC PDU which is not influenced by the missed RLC SDU, i.e. the MAC PDU 875 containing the RLC SDU, in the MBMS subframe. In more detail, when it is possible to calculate the size of the RLC SDU contained in the missed SYNC frame, the eNB can continue building RLC PDU and MAC PDU in consideration of the size of the missed RLC SDU, and transmitting MAC PDUs having no missed RLC SDU in the MBMS subframe while skipping transmission of the MAC PDU in the MBMS subframe reserved for transmitting the MAC PDUs containing the missed RLC SDUs.

Figure 9:
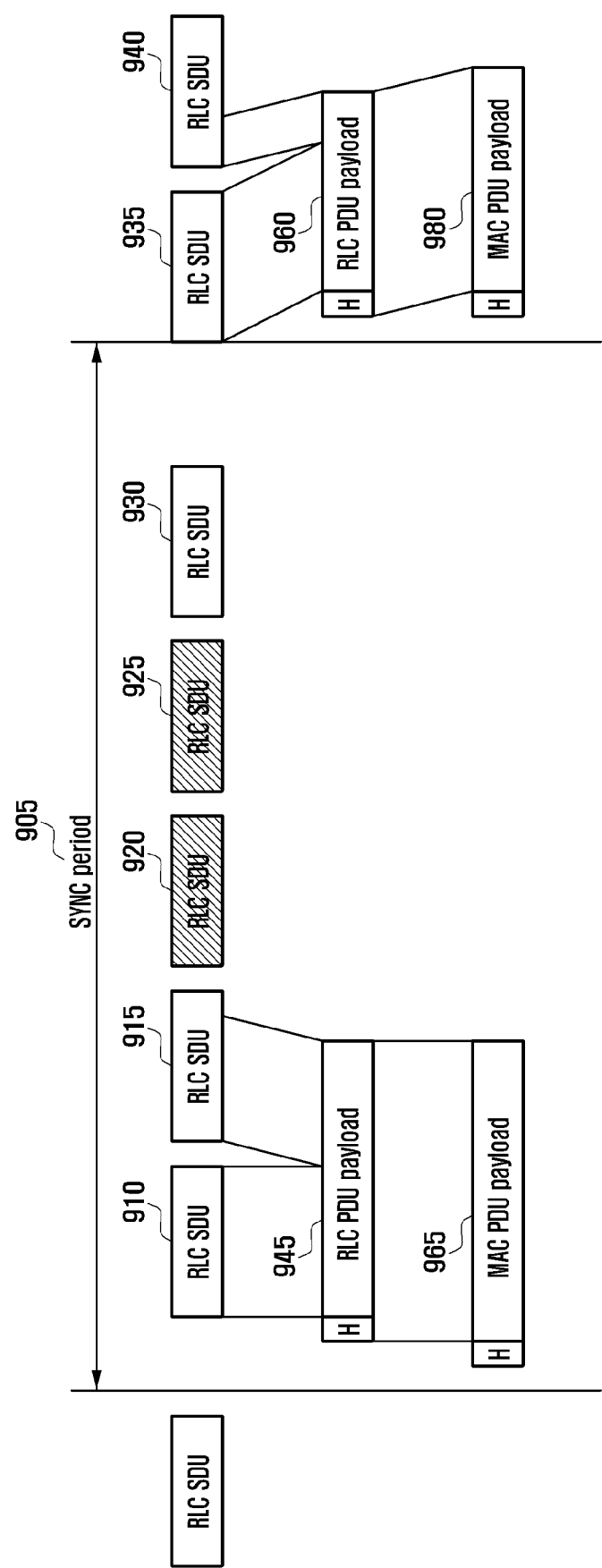
FIG. 9 is a diagram illustrating the first embodiment of the present invention.

FIG. 9 is a diagram illustrating the first embodiment of the present invention. Particularly, FIG. 9 shows the eNB operation in case that one or more RLC SDUs are not received in series.

Referring to FIG. 9, RLC SDUs 920 and 925 are not received among the five RLC SDUs 910 to 930 in a SYNC period. The eNB processes the successfully received RLC SDUs 910 and 915 using the conventional RLC and MAC protocols to build RLC PDUs 945 and 965 and transmits the MAC PDU 965 in a subframe. The eNB analyzes the PNs and OCs of RLC SDUs 915 and 930 to check that the two RLC SDUs are missed in series and calculate the sum of the sizes of the missed RLC SDUs.

In case that more than one RLC SDU are not received in series, the eNB cannot check the sizes of individual missed RLC SDUs and thus fails calculating the space occupied by the missed RLC SDUs in MAC PDU and, as a sequence, it is impossible to configure the MAC PDU precisely in spite of the successful receipt of the next RLC SDUs. Accordingly, when it is detected that multiple RLC SDUs are not received, the eNB suspends building MAC PDU until the next SYNC period starts. Also, the transmission of the MAC PDUs scheduled to be transmitted in the MBMS subframe but not configured is canceled. If the next SYNC period starts, the eNB restarts MBMS data transmission.

Figure 10:
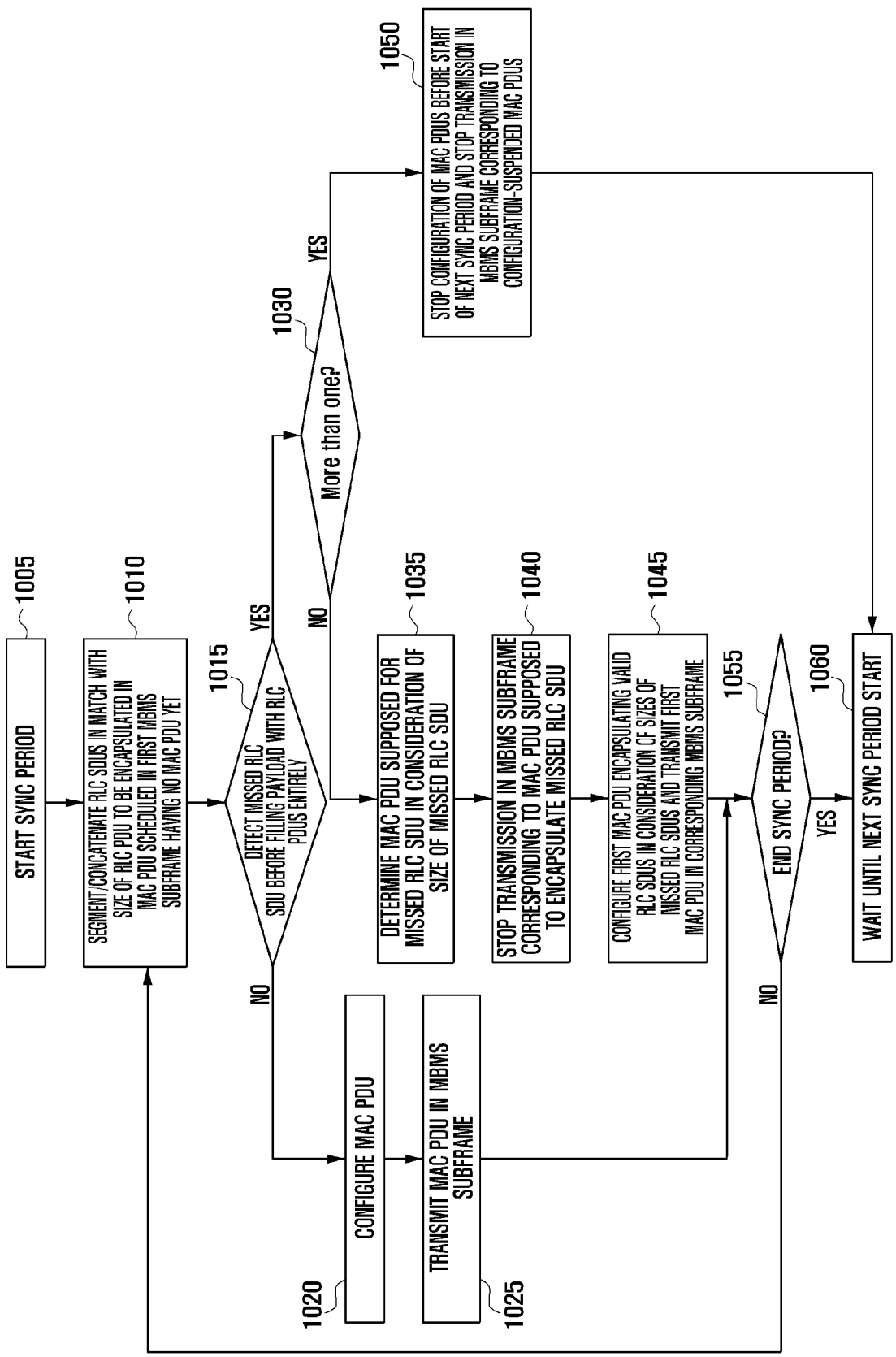
FIG. 10 is a flowchart illustrating an eNB procedure according to the first embodiment of the present invention.

FIG. 10 is a flowchart illustrating an eNB procedure according to the first embodiment of the present invention.

Referring to FIG. 10, once a SYNC period starts at step 1005, the eNB starts operation for generating the MAC PDU to be transmitted in the first MBMS subframe for which no MAC PDU is configured among the MBMS subframes assigned for the SYNC period at step 1010. The eNB segments or concatenates RLC SDUs that have not been encapsulated in MAC PDU or some of the RLC SDUs in match with the size of the RLC PDU.

Next, the eNB determines whether there is any missed RLC SDU until the payload of the RLC PDU is filled entirely at step 1015. If the RLC PDU is filled entirely without missed RLC SDU, the procedure goes to step 1020 and, otherwise if any missed RLC SDU is detected until the payload of the RLC PDU is filled entirely, step 1030. If there is any missed RLC SDU at step 1015, this means that the PNs of the two consecutive RLC SDUs are not in series.

The eNB configures an RLC PDU by adding a header to the RLC payload generated by segmenting/combining the RLC SDUs and multiplexes RLC PDUs into a MAC PDU at step 1020. Next, the eNB transmits the MAC PDU in the corresponding MBMS subframe at step 1025, and then the procedure goes to step 1055.

If any missed RLC SDU is detected before filling the RLC PDU entirely, the eNB determines whether a number of missed RLC SDUs is greater than one and, if so, missed in series at step 1030. This can be determined by checking the PNs of the RLC SDUs adjacent to the missed RLC SDUs. If the number of missed RLC SDUs is one at step 1030, the procedure goes to step 1035.

The eNB calculates the size of the missed RLC SDU using OCs of the RLC SDUs adjacent to the missed RLC SDU and determines the MAC PDU corresponding to the MBMS in which the missed RLC SDU is scheduled in consideration of the size of the missed RLC SDU at step 1035. This also can be determined by performing a MAC PDU creation process with the generation of a virtual RLC SDU having the same size as the missed RLC SDU and checking the MAC PDU in which the RLC SDU equal in size to the missed RLC SDU is encapsulated. The eNB stops transmitting the MAC PDU reserved to carry the missed RLC SDU in the MBMS subframe at step 1040 and transmits the first MAC PDU configured with the encapsulation of the valid RLC SDUs in the corresponding MBMS subframe at step 1045. For example, it is possible to perform the normal MAC PDU generation process with the creasing of virtual RLC SDU equal to the missed RLC SDU in size until the first MAC PDU encapsulating the RLC SDU equal in size to the missed RLC SDU is generated.

If it is determined that more than one RLC SDU are missed in series at step 1030, the eNB transmits the MAC PDUs generated until then in the corresponding MBMS subframe and stops generations of more MAC PDU at step 1050. In the MBMS subframe corresponding to the MAC PDU that is not generated, transmission is stopped until the next SYNC period starts at step 1060.

The eNB determines whether the SYNC period expires at step 1055. If all of the MAC PDUs scheduled in the MBMS subframe designated in the corresponding SYNC period are generated with the exception of the MAC PDU which is not generated due to the missed RLC SDU, the procedure goes to step 1060. If there is any MAC PDU to be generated, the eNB returns the procedure to step 1010.

Second Embodiment

The second embodiment of the present invention proposes a method and apparatus that is capable of generating MAC PDUs normally with the exception of the MAC PDU corresponding to missed RLC SDUs although more than one RLC SDUs are missed in series. As described above, the reason why the eNB cannot generate a MAC PDU with more than one RLC SDUs missed in series is because the eNB does not know the sizes of individual missed RLC SDUs. If the information capable of calculating the size of each missed RLC SDU is transmitted along with the RLC SDU, the eNB can generate the MAC PDUs normally with the received RLC SDUs even when a series of multiple RLC SDUs are not received.

The information capable of calculating the size of each missed RLC SDU can be the previous Octet Count (POC) or the information indicating the size of the data contained in the payload of the previous SYNC frame. For example, if the information capable of calculating the size of $[n+2]^{th}$ RLC SDU is included in the SYNC frame containing $[n+3]^{th}$ RLC SDU, the eNB can calculates the sizes of the missed RLC SDUs even when the SYNC subframe carrying the $[n+1]^{th}$ RLC SDU and the SYNC frame carry the $[n+2]^{th}$ RLC SDU are not received in series. A description is made of a method for calculating the sizes of the missed RLC SDUs in when multiple SYNC frames are missed in series.

Figure 11:
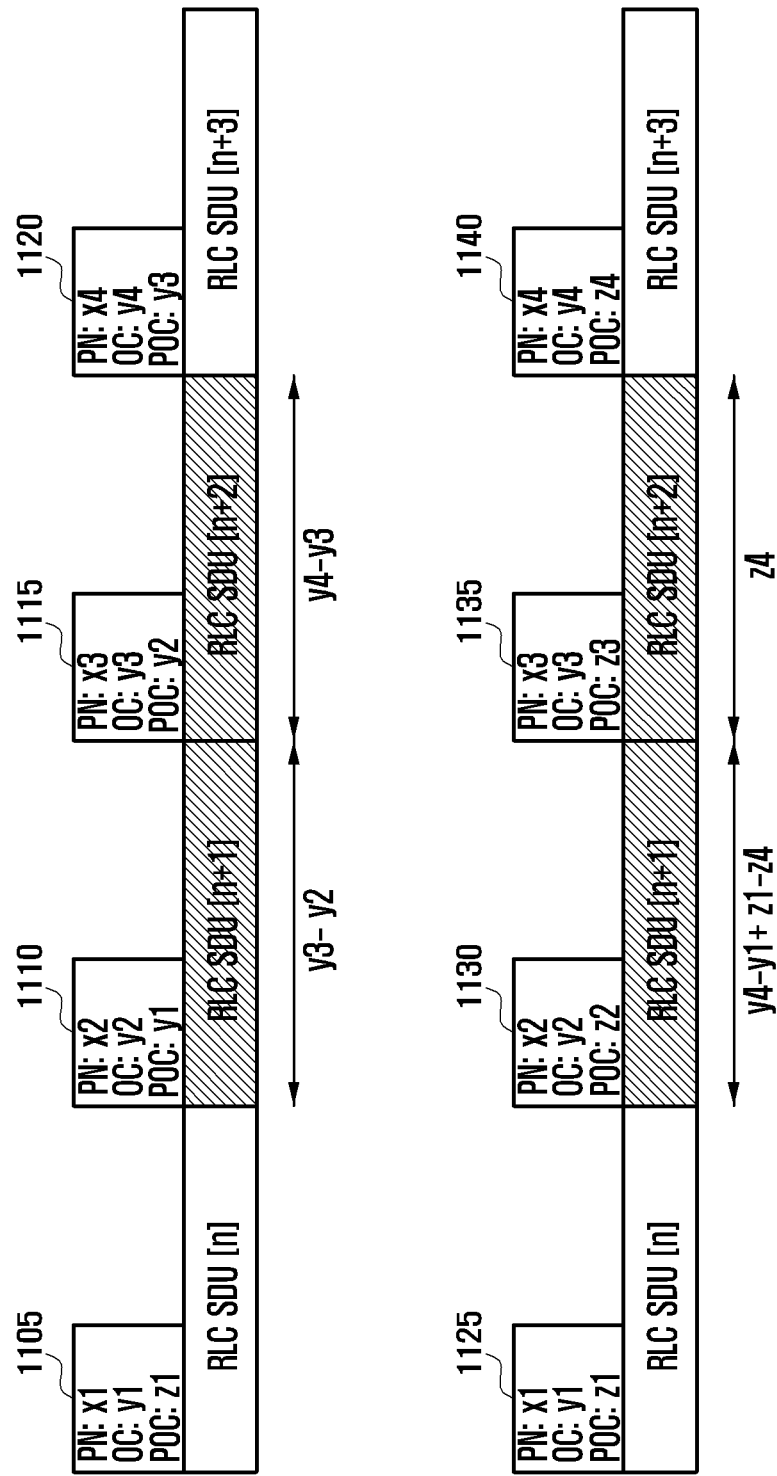
FIG. 11 is a diagram illustrating the second embodiment of the present invention.

FIG. 11 is a diagram illustrating the second embodiment of the present invention.

Referring to FIG. 11, the current SYNC frame includes the OC of the previous SYNC frame, and reference numbers 1105 and 1120 denotes the information contained in each SYNC frame. Particularly, it is assumed that the information 1105 to 1120 of the current frame include OCs of the previous SYNC frame.

Here, if RLC SDU [n] and RLC SDU [n+3] are received and RLC SDU [n+1] and RLC SDU [n+2] are not received, the size of the RLC SDU [n+2] is obtained by subtracting OC(y3) of RLC SDU [n+2] from OC(y4) of RLC SDU [n+3] such that it is possible to calculates the size (y4−y3) of RLC SDU [n+2] only with the information contained in RLC SDU [n+3]. Likewise, the size of RLC SDU [n+1] is the value obtained by subtracting OC(y2) of RLC SDU [n+1] from OC(y3) of RLC SDU [n+2].

If the data size (PPS) contained in the payload of the previous SYNC frame, i.e. the RLC SDU size, is transmitted in the SYNC frame as denoted by reference numbers 1125 and 1140, the size of RLC SDU [n+2] is PPS(z4) of RLC SDU [n+3].

In this case, OC of RLC SDU [n+1] is the value obtained by adding the size of RLC SDU [n] to OC of RLC SDU [n] such that it is possible to calculate the size of RLC SDU [n+1] only with the information contained n RLC SDU [n] and RLC SDU [n+3]. That is, the size of RLC SDU [n+1] is obtained by subtracting the size of RLC SDU [n+2] from the sum of the RLC SDU [n+1] and RLC SDU [n+2], i.e. the value obtained by adding the OC of RLC SDU [n+1] and the size of RLC SDU [n+1] to the OC of RLC SDU [n+3].

As described above, if the SYNC frame includes POC or PPS of n SYNC frames, it is possible to calculate the sizes of the missed RLC SDUs even when up to [n+1] SYNC frames are not missed in series.

In case that m RLC SDUs from RLC SDU [n+1] to RLC SDU [n+m] are missed in series, the method for calculating the sizes of the missed RLC SDUs using POC can be generalized as follows. Here, OC_[x] denotes the OC of $x^{th}$ RLC SDU, and rlc sdu size_[x] denotes the size of $x^{th}$ RLC SDU.

Assuming the SYNC frame carrying RLC SDU [n+m+1] includes OCs of previous [m−1] RLC SDUs, i.e. OC_[n+2] to OC_[n−m], it can be summarized as shown in table 1.

TABLE 1

Size of RLC SDU [n + m] = OC_[n + m + 1] − OC_[n + m]
Size of RLC SDU [n + m + 1] = OC_[n + m] − OC_[n + m − 1]
...
Size of RLC SDU [n + 2] = OC_[n + 3] − OC_[n + 2]
Size of RLC SDU [n + 1] = sum of missed RLC SDUs' sizes − (OC_[n + m + 1] − OC_[n + 2])
Sum of missed RLC SDU's sizes = OC_[n + m + 1] − OC_[n] + rlc sdu size_[n]

In table 1, OC_[n+m+1]−OC_[n+2] is the sum of the sizes of all RLC SDUs from RLC SDU [n+2] to RLC SDU [n+m].

Assuming that the SYNC frame carrying RLC SDU [n+m+1] includes the previous [m−1] RLC SDUs, i.e. rlc sdu size_[n+2]~rlc sdu size_[n+m], the size of RLC SDU can be summarized as shown in table 2.

TABLE 2

Size of RLC SDU [n + m] = rlc sdu size_[n + m]
Size of RLC SDU [n + m − 1] = rlc sdu size_[n + m − 1]
...
Size of RLC SDU [n + 2] = rlc sdu size_[n + 2]
Size of RLC SDU [n + 1] = sum of missed RLC SDUs' sizes − sum of all RLC SDUs from RLC SDU [n + 2] to RLC SDU [n + m]

Figure 12:
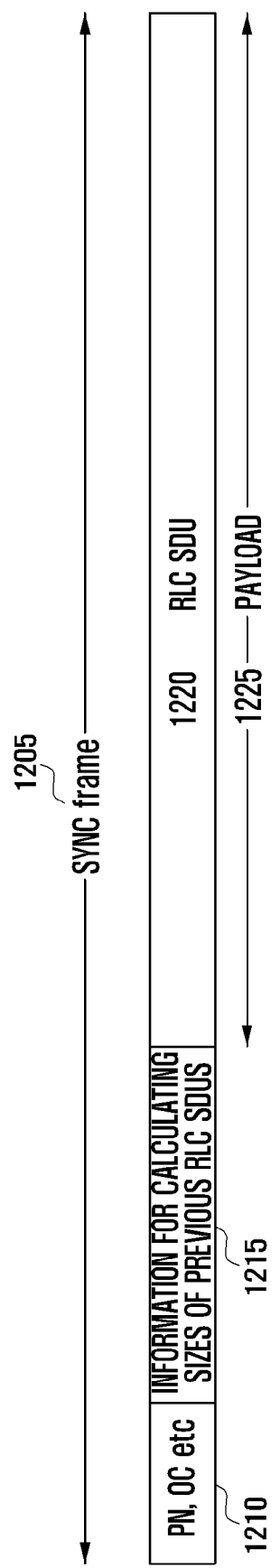
FIG. 12 is a diagram illustrating a configuration of SYNC frame according to the second embodiment of the present invention.

FIG. 12 is a diagram illustrating a configuration of SYNC frame according to the second embodiment of the present invention.

Referring to FIG. 12, the SYNC frame 1205 contains the information of PN and OC 1210 and RLC SDU 1220 like the conventional SYNC frame. Also, the SYNC frame includes the information necessary for the calculation of the sizes of previous RLC SDUs, and this information includes the OCs carried in the previous n SYNC frames or the sizes of the payloads of the previous n SYNC frames in sequence.

If the OC values of the n previous SYNC frames or the sizes of the data of the payloads of the n previous SYNC frames are included in a certain RLC SDU, the eNB can calculate the sizes of [n+1] RLC SDUs carried in the [n+1] SYNC frames even though [n−1] SYNC frames are missed in series right before a certain RLC SDU.

The number of POCs or PPSs that can be carried in the information for calculating the sizes of previous RLC SDUs influences the link stability between MBMS server and eNB. For example, if the link is good enough and thus the packet reception error rate is very low, there is little possibility to fail receiving two or more RLC SDUs in series. In this case, it is possible to prepare for the two missed SYNC frames by including one previous POC or PSS in the information for calculating the sizes of the previous RLC SDUs. If the link state is unstable, it is possible to prepare for a plurality of SYNC frames missed in series by including POCs or PSSs as many as possible.

The number of POCs or PSSs to be contained in the SYNC frame can be agreed as a predetermined value between MBMS server and eNBs and adjusted, if necessary, by the MBMS server. For example, the MBMS server can transmit one POC or PSS in normal state but multiple POCs or PSSs if link condition is degraded.

Figure 13:
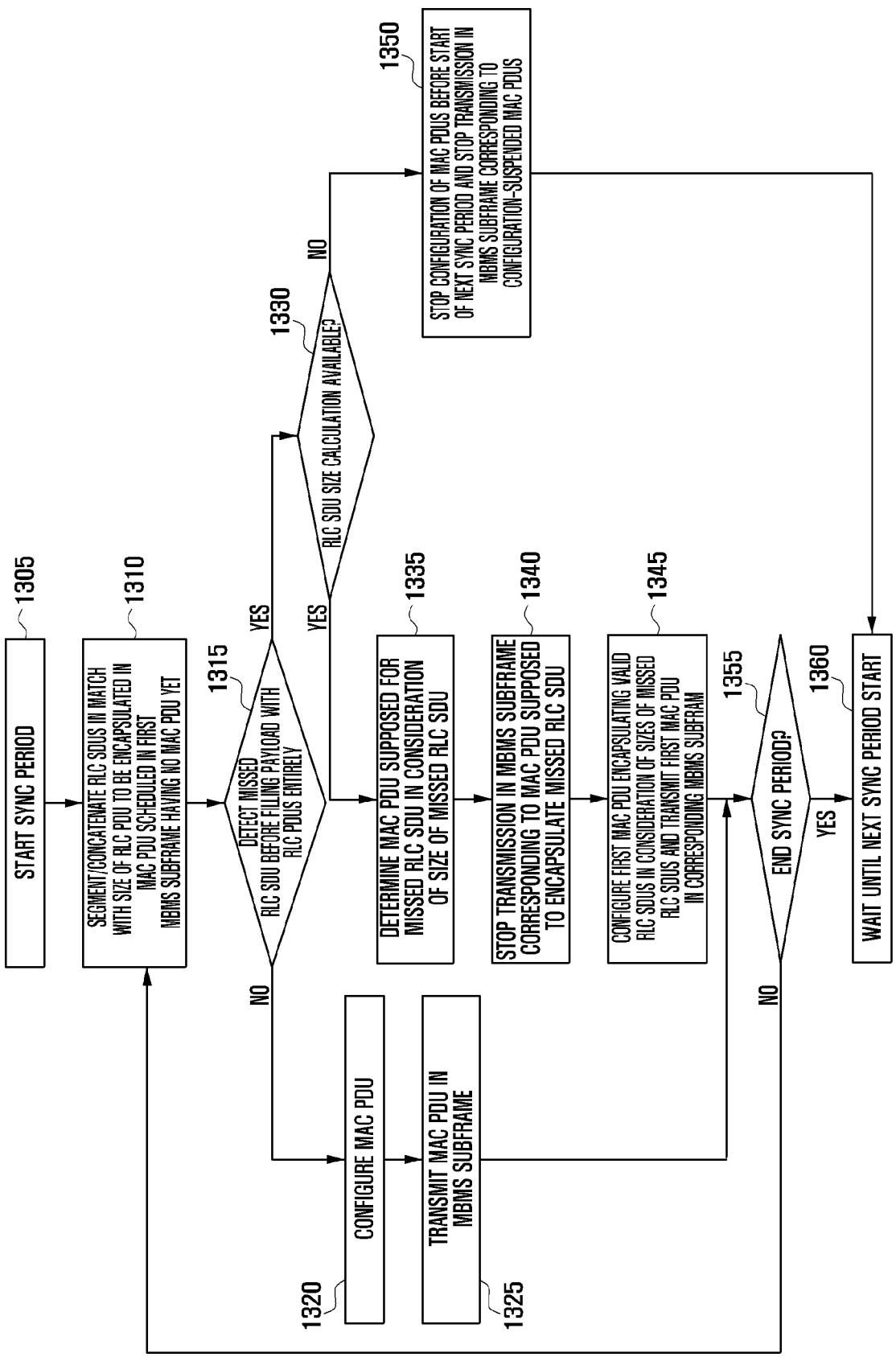
FIG. 13 is flowchart illustrating an eNB procedure according to the second embodiment of the present invention.

FIG. 13 is flowchart illustrating an eNB procedure according to the second embodiment of the present invention.

Referring to FIG. 13, if a certain SYNC period starts at step 1305, the eNB starts operation for configuring MAC PDU to be transmitted in the first MBMS subframe for which no MAC PDU is configured among the MBMS subframes designated in the SYNC period at step 1310. That is, the eNB segments or concatenates the RLC SDUs that are not included in any MAC PDU yet or some of the RLC SDUs in match with the RLC PDU size to be encapsulated in the MAC PDU.

At this time, the eNB monitors to determine whether a missed RLC SDU is detected until the payload of RLC PDU is filled entirely at step 1315 and, if the payload of the RLC PDU is filled without missed RLC SDU, the procedure goes to step 1320 and, otherwise if any missed RLC SDU is detected until the payload of RLC PDU is filled entirely, step 1330.

At step 1320, the eNB adds a header to the RLC payload generated by segmenting/concatenating RLC SDUs to generate RLC PDUs and multiplexes the RLC PDUs into MAC PDU. Next, the eNB transmits the MAC PDU in the corresponding MBMS subframe at step 1325, and the procedure goes to step 1355.

If any missed RLC SDU is detected before the payload of the RLC PDU is filled entirely at step 1315, the procedure goes to step 1330. At step 1330, the eNB determines whether it is possible to calculate the sizes of all missed RLC SDUs. Under the assumption that the number of RLC SDUs missed in series is n and the number of POCs or PSSs contained in the SYNC frame following the last missed RLC SDU is m, if n is greater than m+1, the eNB cannot calculate the sizes of some of the missed RLC SDUs; and otherwise if n is equal to or less than m+1, the eNB can calculate the sizes of all missed RLC SDUs. If it is possible to calculate the sizes of all missed RLC SDUs, the procedure goes to step 1335 and, otherwise if it is possible to calculate the sizes of some of the missed RLC SDUs, step 1350.

At step 1335, the eNB determines the MAC PDU corresponding to the MBMS subframe in which the missed RLC SDU is scheduled in consideration of the size of the missed RLC SDU. This can be done through a normal MAC PDU generation process by generating a virtual RLC SDU having the same size as the missed RLC SDU and determining the MAC PDU in which the RLC SDU having the same size as the missed RLC SDU is to be contained. Then eNB suspends transmission in the MBMS subframe corresponding to the MAC PDU in which the missed RLC SDU is to be transmitted at step 1340, and the procedure goes to step 1345.

Next, the eNB transmits the first MAC PDU generated with the valid RLC SDUs in the corresponding MBMS subframe at step 1345. This can be done by generating a virtual RLC SDU having the same size as the missed RLC SDU and continuing the normal MAC PDU generation process until the first MAC PDU in which the RLC SDU having the same size as the missed RLC is not contained.

If it is impossible to calculated the sizes of some missed RLC SDUs at step 1330, the procedure goes to step 1350. At step 1350, the eNB transmits the MAC PDUs generated until then in the corresponding MBMS subframe and stops generating MAC PDU anymore. The transmission stops in the MBMS subframe corresponding to the non-generated MAC PDUs, and the procedure goes to step 1360.

The eNB determines whether the SYNC period has expired at step 1355. If all of the MAC PDUs to be transmitted in the MBMS subframe during the corresponding SYNC period are generated with the exception of the MAC PDUs excluded by the missed RLC SDUs, the procedure goes to step 1360. If there is MAC PDUs that are not generated yet, the eNB returns the procedure to step 1310.

Third Embodiment

In the third embodiment of the present invention, the MBMS server transmits a control message including the information on the size of the payload of each synch frame in a SYNC period to the eNB. If the control message is received, the eNB can checks the sizes of all RLC SDUs in the corresponding SYNC period so as to generate the MAC PDUs corresponding to the received RLC SDUs successfully regardless of the number of missed SYNC frames.

Figure 14:
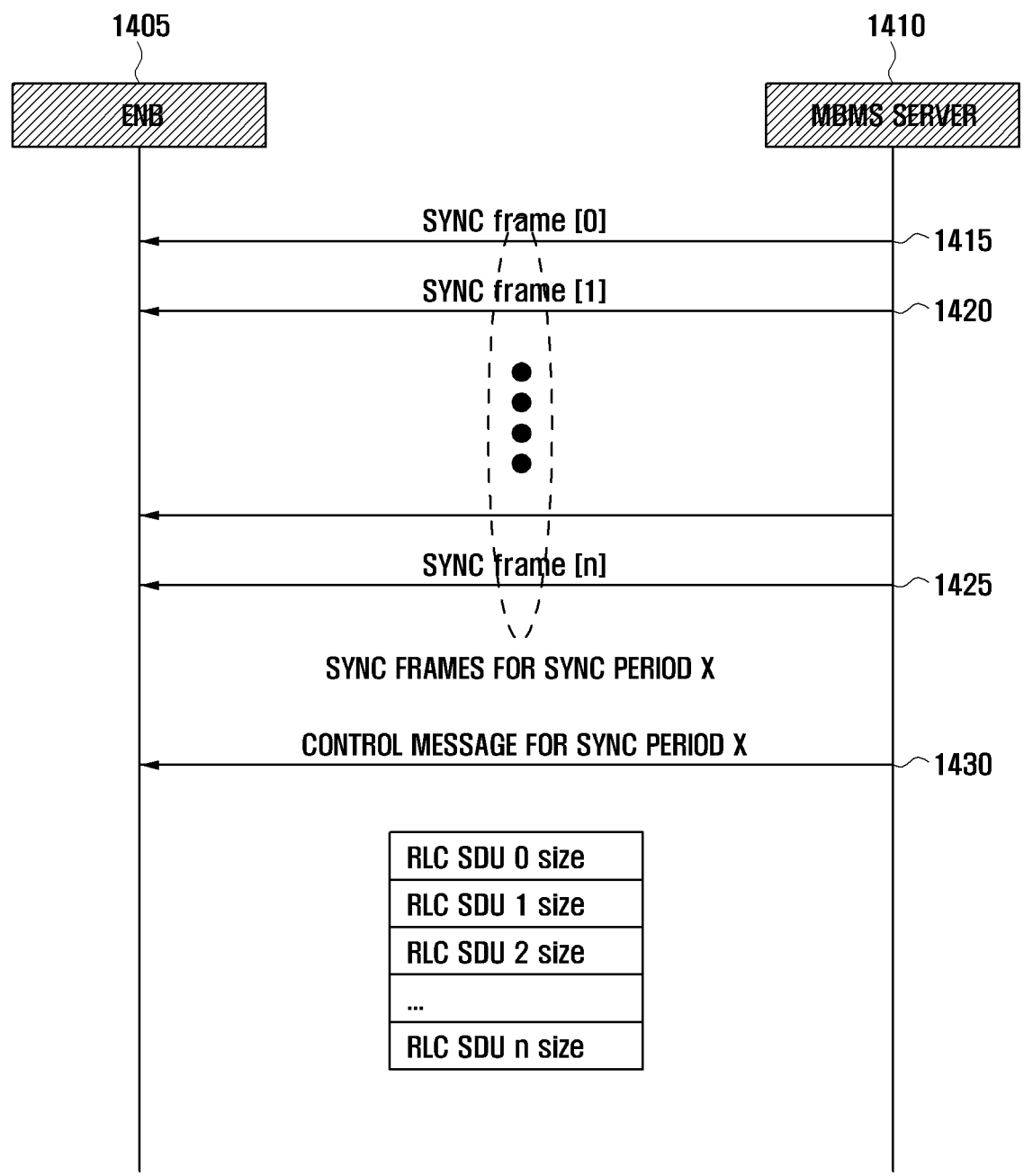
FIG. 14 is a drawing illustrating the third embodiment of the present invention.

FIG. 14 is a drawing illustrating the third embodiment of the present invention.

Referring to FIG. 14, the MBMS server 1410 transmits n SYNC frames from the SYNC frame 1415 having PN of 0 to the SYNC frame 1425 having PN of n which contain RLC SDUs to the eNB 1405 in the SYNC period x. the MBMS server also transmits a control message 1430 informing of the sizes of payloads of the SYNC frames or the sizes of contained RLC SDUs to the eNB 1405 for the SYNC period x.

The control message 1430 contains the sizes of the RLC SDUs carried in the SYNC frame for the SYNC period x. For example, the sizes of all RLC SDUs contained in the SYNC frames for the SYNC period x, e.g. the size of RLC SDU [0] contained in the SYNC frame [0] and the size of RLC SDU [1] contained in the SYNC frame [1], can be included.

In case that the control message 1430 informing of the sizes of RLC SDUs is transmitted separately, there is no need to transmit the OC information in the SYNC frames such that the OC information is not included in the headers of the SYNC frames carrying the RLC SDUs in the their embodiment of the present invention. Accordingly, the eNB which has not received the control message indicating the sizes of RLC SDUs cannot generate the MAC PDUs precisely after failing receipt of any RLC SDU even when only one RLC SDU is not received and, as a consequence, stop transmission in the MBMS subframe until the next SYNC period starts.

If the control message 1430 indicating the sizes of RLC SDUs is received successfully, the eNB can generate MAC PDUs with the successfully received RLC SDUs even through some RLC SDUs are not received and transmit the generated MAC PDUs in the MBMS subframe with the exception of the MAC PDUs corresponding to the missed RLC PDUs.

Figure 15:
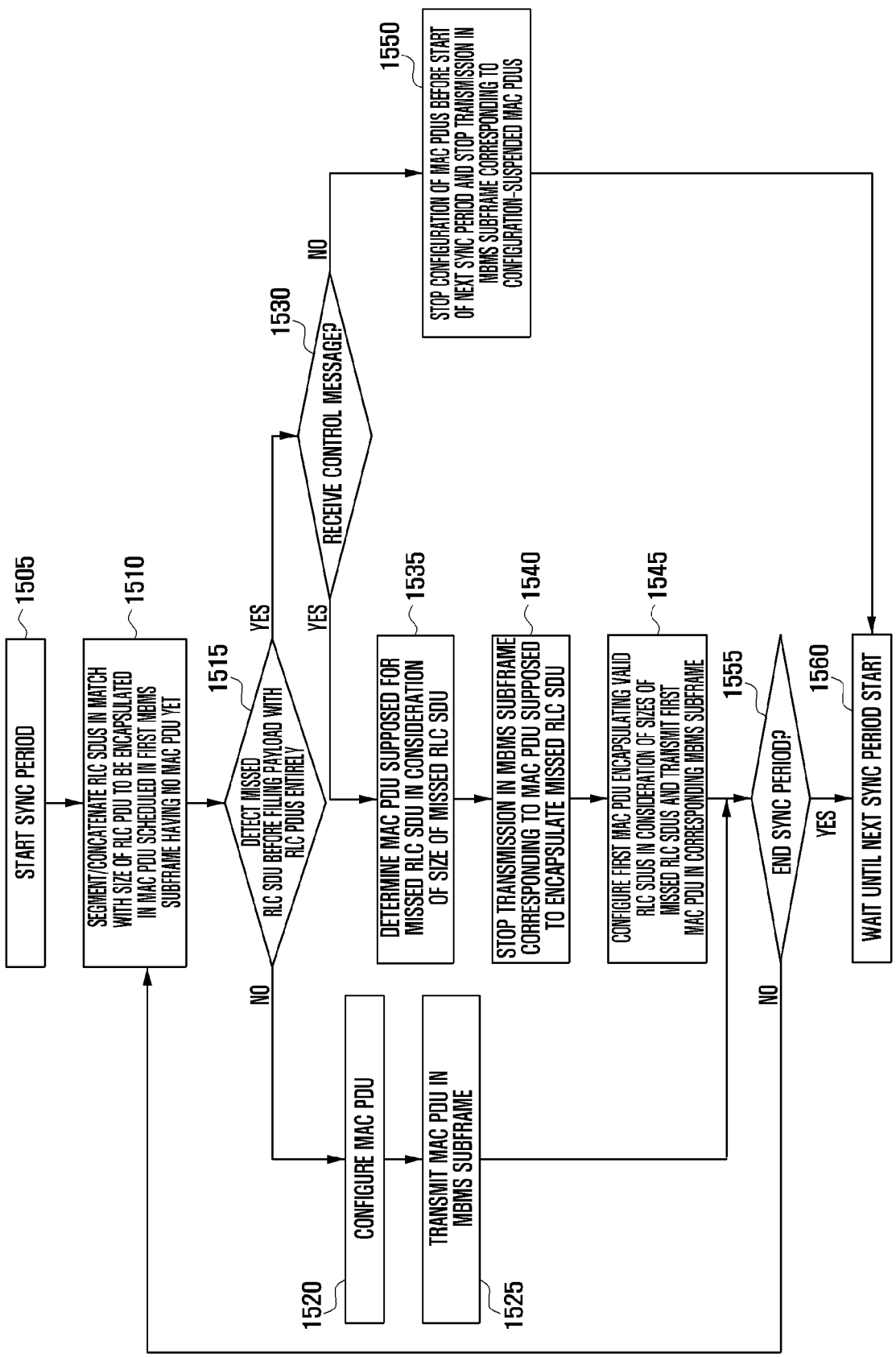
FIG. 15 is a flowchart illustrating an eNB device operation according to the third embodiment of the present invention.

FIG. 15 is a flowchart illustrating an eNB device operation according to the third embodiment of the present invention.

Referring to FIG. 15, if a SYNC period starts at step 1505, the eNB configures the MAC to be transmitted in the first MBMS subframe for which not MAC PDU is configured yet among the MBMS subframes in the SYNC period at step 1510. The eNB segments or concatenates, in series, the RLC SDUs not included in any MAC PDU yet or some of RLC SDUs, in match with the size of RLC SDU to be encapsulated in the MAC PDU.

At this time, the eNB monitors to determine whether any missed RLC SDU is detected until the payload of RLC PDU is filled entirely at step 1515 and, if the payload of the RLC PDU is filled without missed RLC SDU, the procedure goes to step 1520 and, otherwise if any missed RLC SDU is detected until the payload of RLC PDU is filled entirely, step 1530.

At step 1520, the eNB adds a header to the RLC payload generated by segmenting/concatenating RLC SDUs to generate RLC PDUs and multiplexes the RLC PDUs into MAC PDU. Next, the eNB transmits the MAC PDU in the corresponding MBMS subframe at step 1525, and the procedure goes to step 1555. If any missed RLC SDU is detected before the payload of the RLC PDU is filled entirely at step 1515, the procedure goes to step 1530.

At step 1530, the eNB determines whether a control message including the information on the sizes of the RLC SDUs for the SYNC period is available. If the control message is available, the procedure goes to step 1535 and, otherwise, step 1550.

At step 1535, the eNB checks the sizes of the missed RLC SDUs using the information contained in the control message and determines the MAC PDU corresponding to a MBMS subframe in which the missed RLC SDU is encapsulated in consideration of the sizes of the missed RLC SDUs. This can be done by generating a virtual RLC SDU having the same size as the missed RLC SDU and continuing the normal MAC PDU generation process so as to check the MAC PDU in which the RLC SDU is encapsulated therein. Next, the eNB stops transmission in the MBMS subframe corresponding to the MAC PDU reserved to carry the missed RLC SDU, and the procedure goes to step 1545.

Next, the eNB configures the first MAC PDU with the valid RLC SDUs and transmits the first MAC PDU in the corresponding MBMS subframe. This can be done by generating a virtual RLC SDU having the same size as the missed RLC SDU and continuing the normal MAC PDU generation process until the first MAC PDU in which the RLC SDU having the same size as the missed RLC is not contained.

It the control message informing of the sizes of the RLC SDUs is not available at step 1530, the procedure goes to step 1550. At step 1550, the eNB transmits the MAC PDUs generated until then in the corresponding MBMS subframe and stops generating MAC PDU anymore. The transmission stops in the MBMS subframe corresponding to the non-generated MAC PDUs, and the procedure goes to step 1560.

The eNB determines whether the SYNC period has expired at step 1555. If all of the MAC PDUs to be transmitted in the MBMS subframe during the corresponding SYNC period are generated with the exception of the MAC PDUs excluded by the missed RLC SDUs, the procedure goes to step 1560. If there is any MAC PDU that is not generated yet, the eNB returns the procedure to step 1510.

Figure 16:
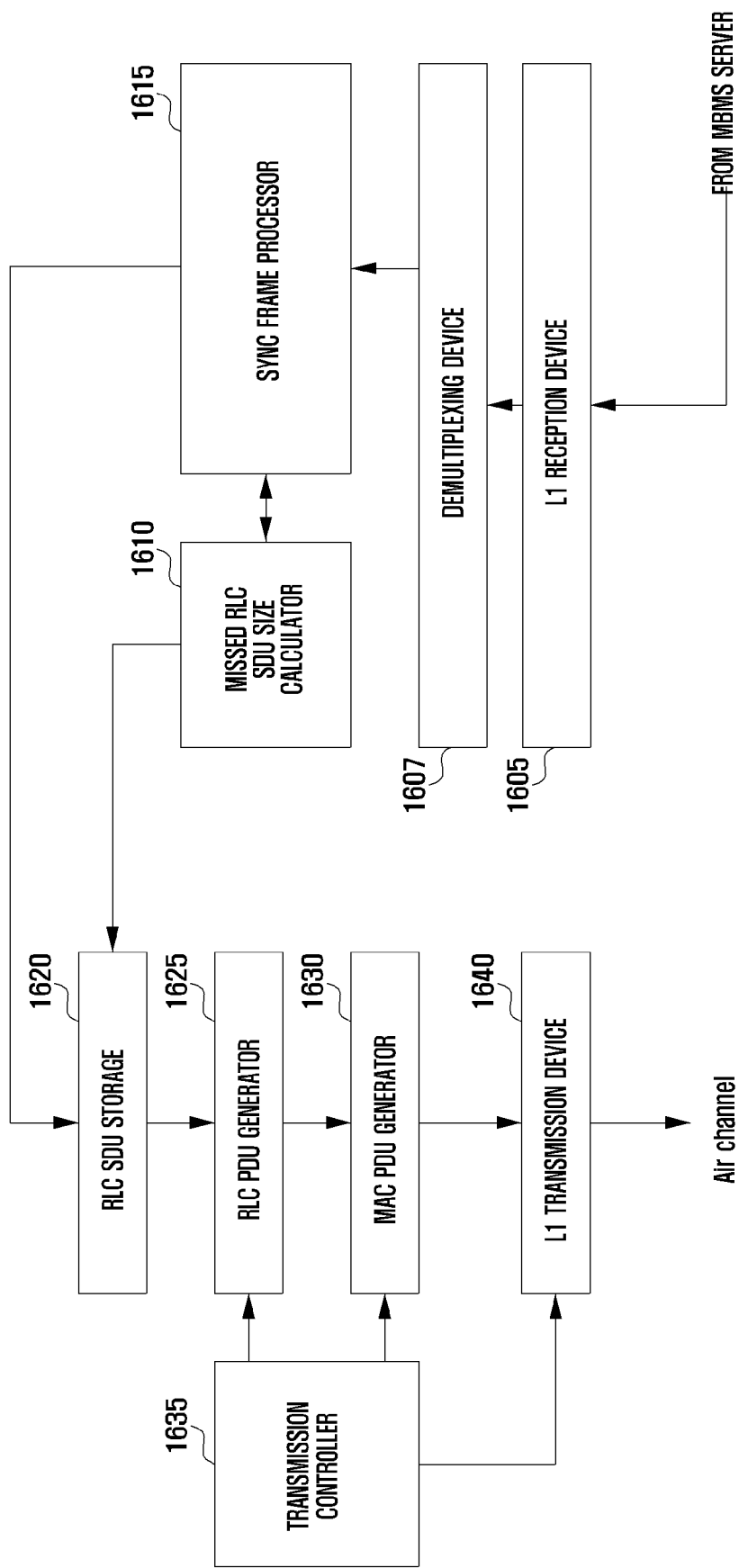
FIG. 16 is a block diagram illustrating the eNB device according to an embodiment of the present invention.

FIG. 16 is a block diagram illustrating the eNB device according to an embodiment of the present invention.

Referring to FIG. 16, an L1 reception device 1605 is the device for receiving the data transmitted by the MBMS server. According to the type of the wired link connected to the eNB, the L1 reception device 1605 can be an Ethernet reception device or an optical reception device. The data received by the L1 reception device 1605 are input to the demultiplexing device 1607. The demultiplexing device 1607 transfers the SYNC frame corresponding to a certain MBMS service to the SYNC frame processor of the corresponding MBMS service.

The SYNC frame processor 1615 receives the SYNC frame and transfers the RLC SDU contained in the payload and related information, e.g. PN and OC, to the RLC SDU storage 1620. The SYNC frame processor 1615 transfers POC or PPS carried in the SYNC frame to a missed RLC SDU size calculator 1610. If the control message including the RLC SDU size information is received, the SYNC frame processor 1615 also transfers the control information to the missed RLC SDU size calculator 1610.

The RLC SDU storage 1620 stores all or some of RLC SDUs that are not transmitted in sequence of PNs. If the PNs of two adjacent RLC SDUs are not consecutive, the RLC SDU storage 1620 transfers the non-consecutive PNs and OCs corresponding to the PNs to the RLC SDU size calculator 1610. Afterward, the RLC PDU payload generation process is performed in consideration of the sizes of the missed RLC SDUs that are notified by the missed RLC SDU size calculator 1610. The RLC SDU storage 1620 segments/concatenates all or some of the RLC SDUs in match with the size required in the RLC PDU generator 1625 to generate the RLC PDU payload and transfers the RLC PDU payload to the RLC PDU generator 1625.

If the RLC PDU payload is not filled entirely due to the missed RLC SDUs, the RLC SDU storage 1620 notifies the RLC PDU generator 1625 that there is no data to provide. If the missed RLC SDU size calculator 1610 notifies the RLC SDU storage 1620 that the missed SDU size calculation is impossible after a specific RLC SDU, the RLC SDU storage 1620 stops generating RLC payload with the RLC SDU from the specific RLC SDU anymore and notifies the RLC PDU generator 1625 that there is not data to be provided. Otherwise if the missed RLC SDU size calculator 1610 notifies the RLC SDU storage 1620 of the sizes of the missed RLC SDUs, the RLC SDU storage 1620 generates the RLC PDU payload from the time point when the RLC PDU payload generation is possible in consideration of the sizes of the missed RLC SDUs and transfers the RLC PDU payload to the RLC PDU generator 1625.

The missed RLC SDU size calculator 1610 calculates the sizes of the missed RLC SDUs based on the information provided by the SYNC frame processor 1615 and RLC SDU storage 1620 and transfers this information to the RLC SDU storage 1620. The missed RLC SDU size calculator 1610 also notifies the RLC SDU storage 1620 that the sizes of the missed RLC SDUs cannot be calculated.

The RLC PDU generator 1625 generates RLC PDU in size indicated by the transmission controller 1653. The RLC PDU generator 1625 determines the amount of data to be contained in the RLC PDU payload in match with the size indicated by the transmission controller 1653 and instructs the RLC SDU storage 1625 to generate the payload in corresponding size. The RLC PDU generator 1625 generates RLC PDU by adding an RLC header to the payload provided by the RLC SDU storage 1620 and transfers the RLC PDU to the MAC PDU generator 1630. If there is no RLC PDU payload provided from the RLC SDU storage 1620, the RLC PDU generator 1625 also does not provide RLC PDU to the MAC PDU generator 1630.

The MAC PDU generator 1630 encapsulates the RLC PDU provided by the RLC PDU generator 1625 as payload and adds a MAC header to generate a MAC PDU. The MAC PDU generator 1630 transfers the MAC PDU to the L1 transmission device 1640 at the time point indicated by transmission controller 1635. If nor RLC PDU is provided by the RLC PDU generator 1625, the MAC PDU generator 1630 cannot generate MAC PDU.

The L1 transmission device 1640 transmits the MAC PDU provided by the MAC PDU generator 1630 at the transmission time point indicated by the transmission controller 1635 on the predetermined transmission resource according a predetermined modulation/channel coding scheme. If there is no MAC PDU provided by the MAC PDU generator 1630 at the time point indicated by the transmission controller 1635, the L1 transmission device 1640 does not start transmission at the transmission time point.

The transmission controller 1635 checks the MBMS subframe and controls the RLC PDU generator 1625, MAC PDU generator 1630, and L1 transmission device 1640 to transmit MAC PDUs in the MBMS subframe at an appropriate time point before the start of the MBMS subframe.

As described above, the method and apparatus for transmitting multimedia broadcast data in a wireless communication system according to the present invention is capable of transmit data stably while maintaining data integrity of the multimedia broadcast data.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method by a base station in a wireless communication system, the method comprising:
    receiving a plurality of service data units (SDUs) from a core network node;
    receiving a control message including a plurality of length information respectively corresponding to the plurality of SDUs from the core network node;
    identifying consecutive SDUs are not received; and
    muting one or more subframes impacted by a loss of the consecutive SDUs, based on the length information included in the control message,
    wherein the control message is transmitted from the core network node after the plurality of SDUs are transmitted from the core network node.

2. The method of claim 1, wherein the length information is received at an end of a synchronization period of the plurality of SDUs.

3. The method of claim 1, wherein the control message further includes respective length information of other SDUs transmitted from the core network node in a synchronization period.

4. A base station in a wireless communication system, the base station comprising:
    a transceiver configured to transmit and receive a signal; and
    a controller configured:
    to receive a plurality of service data units (SDUs) from a core network node,
    to receive a control message including a plurality of length information respectively corresponding to of the plurality of SDUs from the core network node,
    to identify consecutive SDUs are not received, and
    to mute one or more subframes impacted by a loss of the consecutive SDUs based on the length information included in the control message,
    wherein the control message is transmitted from the core network node after the plurality of SDUs are transmitted from the core network node.

5. The base station of claim 4, wherein the length information is received at an end of a synchronization period of the plurality of SDUs.

6. The base station of claim 4, wherein the control message further includes respective length information of other SDUs transmitted from the core network node in a synchronization period.

* * * * *